(12) United States Patent
Ohwaki et al.

(10) Patent No.: US 7,470,465 B2
(45) Date of Patent: Dec. 30, 2008

(54) CONNECTOR CONTACT MATERIAL

(75) Inventors: Takeshi Ohwaki, Kobe (JP); Kasumi Yanagisawa, Kobe (JP); Kozo Saiki, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 345 days.

(21) Appl. No.: 11/264,145

(22) Filed: Nov. 2, 2005

(65) Prior Publication Data

US 2006/0134403 A1 Jun. 22, 2006

(30) Foreign Application Priority Data

Dec. 20, 2004 (JP) ............................... 2004-367778

(51) Int. Cl.
- *B32B 5/02* (2006.01)
- *B32B 15/04* (2006.01)
- *B32B 15/20* (2006.01)

(52) U.S. Cl. ..................... 428/327; 428/336; 428/457

(58) Field of Classification Search ................ 428/336, 428/421, 422, 457; 524/462, 463; 508/181, 508/182, 582, 588
See application file for complete search history.

(56) References Cited

U.S. PATENT DOCUMENTS

| | | | | |
|---|---|---|---|---|
| 4,941,987 A | * | 7/1990 | Strepparola et al. | ......... 508/182 |
| 6,062,920 A | * | 5/2000 | Jordan et al. | ................ 439/861 |
| 2001/0020063 A1 | | 9/2001 | Kapeliouchko et al. | |

FOREIGN PATENT DOCUMENTS

| | | |
|---|---|---|
| EP | 1 127 896 A1 | 8/2001 |
| EP | 1 281 789 A1 | 2/2003 |
| GB | 610328 | 10/1948 |
| JP | 4-115475 | 4/1992 |
| JP | 10-223290 | 8/1998 |
| JP | 10-302866 | 11/1998 |
| JP | 11-16623 | 1/1999 |
| JP | 2916001 | 4/1999 |
| JP | 2000-15743 | 1/2000 |
| JP | 2002-60974 | 2/2002 |
| JP | 2002-212582 | 7/2002 |

OTHER PUBLICATIONS

Patent Abstracts of Japan, JP 04-115475, Apr. 16, 1992.

* cited by examiner

*Primary Examiner*—Ramsey Zacharia
(74) *Attorney, Agent, or Firm*—Oblon, Spivak, McClelland, Maier & Neustadt, P.C.

(57) ABSTRACT

Disclosed is a connector contact material that has a small friction coefficient, requires a small insertion force, and moreover does not raise contact resistance while maintaining the properties and insertion operability as a connector. The connector contact material has a coating film comprising the mixture of fluoric resin particles and fluoric oil on the surface of a substrate, wherein the thickness of the coating film is 0.2 to 0.5 μm, and the proportion of the fluoric resin particles to the total amount of the fluoric resin particles and the fluoric oil in the coating film is 20% to 40% in mass, and thereby the connector contact material has a small friction coefficient, requires a small insertion force, and moreover does not raise contact resistance.

6 Claims, No Drawings

CONNECTOR CONTACT MATERIAL

BACKGROUND OF THE INVENTION

The present invention relates to a connector contact material capable of being inserted with a small insertion force at the time of the connection of a connector, in particular to a connector contact material suitable for multipole terminals of an automobile.

In recent years, as the electrification of an automobile advances, the number of the poles of a multipole connector formed by assembling terminals, namely the number of terminals, has been increasing. A force required for the connection of a connector is roughly estimated by multiplying the insertion force per terminal by the number of wires (heretofore, generally 10 to 20 poles). Hence, when the insertion force per terminal is great, the force required for the connection of a multipole connector considerably increases in proportion to the number of the wires in a wire harness.

In particular, the recent remarkable advancement and development of car electronics cause the number of electronic devices and CPU's mounted on an automobile to increase by leaps and bounds, the number of the wires in a wire harness also increases accordingly, and thus the multipolarization (30 to 40 poles) of a connector has been strongly demanded.

When the number of poles increases as stated above, the force required for the connection of a connector also increases in proportion to the number of wires, the insertion force to fit the connector increases, and the connector becomes increasingly unable to be connected without an auxiliary tool such as a bolt and a lever. In this light, fit-contact-type terminals capable of weakening the insertion force of the terminals and moreover maintaining stable low contact resistance are desired.

As a material for connector contacts, a substance produced by plating a substrate of copper or copper alloy with tin has been used. Tin plating is inexpensive and has good solderability. Further, a tin-plating layer is soft and adheres to a fresh metallic surface at the time of fitting and therefore a good electrical contact can be obtained. However, a tin-plated connector contact material requires a great insertion force and hence is hardly applicable to an aforementioned multipole connector. Furthermore, in the case of frequent insertion and extraction, a tin-plated connector contact material wears markedly, the contact resistance rises due to the exposure and oxidation of the base material, and, in order to inhibit the drawbacks, it is necessary to increase the thickness of the tin-plating layer. In addition, with tin plating, whisker may sometimes occur at plating.

With the intent of solving the problems, methods for lowering contact resistance by applying surface treatment to a connector contact material for multipoles are proposed.

For example, JP-A No. 223290/1998 discloses a technology of lowering contact resistance at a joint and improving wear resistance by connecting a contact member the wear resistance of which is enhanced by hard nickel plating to another contact member to which a composite plating layer formed by the eutectoid of nickel or nickel alloy and fluoric resin particles is applied.

Further, JP No. 2916001 discloses a technology of forming a low-friction conductive layer capable of weakening an insertion force required for connecting a terminal to another terminal while securing the conductivity between electrical contact parts by mixing a superfine conductive metal with a low friction resin material and firmly fixing the mixture to the parts corresponding to the electrical contact parts.

Furthermore, JP-A No. 15743/2000 discloses a means of applying an organic compound containing a thiol group (-SH) as a substantially monomolecular film to a plated material used for a contact of a connector and thereto applying a film of macromolecular aggregate having fluidity as a lubricant layer. It says that, thereby, high resistance to corrosive environment, the stability of contact resistance and lubricity at the joint of a connector can be secured, and therefore it is possible to improve wear resistance even in the case of the frequent fitting of a connector and mitigate the force for the insertion and extraction of the connector.

Yet further, JP-A No. 302866/1998 discloses a technology that makes it possible to weaken an insertion force and secure sufficient corrosion resistance by coating a fit-contact-type terminal to which tin plating 0.1 to 0.3 μm in thickness is applied with a rust preventing lubricant containing a chelating agent and wax.

Yet further, JP-A No. 16623/1999 discloses a technology capable of weakening the insertion force of a terminal by applying coating of carbon in the form of diamond to the slide part of at least either a male component or a female component of a fit-contact-type terminal to which tin plating is applied.

Yet further, JP-A No. 60974/2002 discloses a technology that does not cause the discoloration of the appearance after degradation, improves solderability, and secures excellent slide performance by applying benzotriazole or a derivative thereof so that the thickness thereof, measured as C, is 0.003 to 0.01 μm to the surface of a connector contact material to which copper containing tin plating is applied.

In addition, JP-A No. 212582/2002 discloses a technology that makes it possible to decrease a friction coefficient at the time of the attachment and detachment of an electronic part such as a connector and also lower contact resistance by: applying a coating film of a water-soluble metal surface lubricant produced by emulsifying paraffin, liquid paraffin, or paraffinic carbon hydride of Vaseline or squalene into water with a surfactant; and thereafter drying the coating film.

However, the prior art described in the above documents cannot sufficiently exhibit the effect of weakening an insertion force itself or the effect of weakening an insertion force while maintaining the properties and insertion operability as a connector.

For example, with the technology disclosed in JP-A No. 223290/1998, the effect of weakening an insertion force itself is insufficient.

In the case of JP No. 2916001, a good friction reduction effect can be obtained by firmly fixing a resin material such as Teflon (a registered trademark) to a coating film about 2 to 4 μm in thickness. However, the direct contact between terminals is hindered and, even when conductive metallic fine powder is mixed into the resin layer, the contact between the particles of the metallic powder is not assured, and therefore the conductivity between the terminals is still insufficient. Incidentally, JP No. 2916001 exemplifies the decrease of an insertion force but does not show data related to the conductivity between electric contact parts.

In the technology disclosed in JP-A No. 15743/2000, when it is attempted to secure sufficient lubricity, it is necessary to apply "a film of macromolecular aggregate having fluidity" in a considerable amount. The examples of the coating of poly-α-olefinic oil about 400 μm in thickness, diester oil about 200 μm in thickness and polyphenylether about 100 μm in thickness are described in the embodiments. However, when oil is applied in the thickness of several tens to several hundreds of microns, the flow of the oil and greasiness cannot be avoided on the material surface and the examples are not practically applicable. In addition, when a plated material subjected to such treatment is stacked in layers, sticking (blocking) between the layers caused by the surface tension of the oil occurs and operability is also hindered.

In the case of JP-A No. 302866/1998, long term stability is required for a rust preventing lubricant applied to terminals. However, an ordinary chelating agent and wax are not always excellent in the long term stability.

Though carbon in the form of diamond disclosed in JP-A No. 16623/1999 has an excellent property as a slide member, it is electrically insulative and thus the application of the coating to a conductive part is inappropriate from the viewpoint of lowering contact resistance. The partial application of coating to the surface of a terminal is cumbersome and thus not appropriate for mass production.

With the technology disclosed in JP-A No. 60974/2002, the effect of the oiliness of benzotriazole or a derivative thereof is generally small and therefore a sufficient slide performance cannot be obtained.

In the case of JP-A No. 212582/2002, long term stability is required for a rust preventing lubricant applied to terminals. However, generally speaking, paraffinic carbon hydride is not always excellent in the long term stability. In addition, a water-soluble lubricant has smaller effect in reducing friction than a water-insoluble lubricant.

SUMMARY OF THE INVENTION

The present invention has been established while attention is focused on the above situation and the object thereof is to provide a connector contact material that has a small friction coefficient, requires a small insertion force, and does not cause the contact resistance to rise while maintaining the properties and insertion operability as a connector.

The gist of the connector contact material, which attains the above object, according to one aspect of the present invention resides in a connector contact material having a coating film comprising the mixture of fluoric resin particles and fluoric oil on the surface of a substrate, wherein the thickness of the coating film is 0.2 to 0.5 µm; and the proportion of the fluoric resin particles to the total amount of the fluoric resin particles and the fluoric oil in the coating film is 20% to 40% in mass.

With regard to an electrical contact, it is desirable that a component used for rendering lubricity is stable for a long period of time. Further, at a connector contact, with only lubricating oil, the effect of reducing friction is insufficient. In addition, the formation of a resin film on the surface of a substrate (conductive substrate) for a connector contact generally yields the effect of reducing friction but is disadvantageous from the viewpoint of contact resistance.

In contrast, by coating the surface of a substrate (conductive substrate) for a connector contact with fluoric resin particles and fluoric oil, it becomes possible to sufficiently decrease the friction coefficient and the insertion force and further sufficiently lower contact resistance (not to raise the contact resistance).

When fluoric resin particles and fluoric oil are applied, the fluoric resin particles disperse and adhere to the fitting parts of a connector. Thereby, it is possible to decrease the overall friction coefficient to a sufficiently low level. Further, the parts to which fluoric resin particles do not adhere exist on the surface of the conductive substrate of the connector and thereby a sufficiently low contact resistance can be secured.

However, as stated in the gist of the present invention, the above effects show up only when the thickness of the coating film itself comprising the mixture of fluoric resin particles and fluoric oil and the proportion of the fluoric resin particles to the total amount of the fluoric resin particles and the fluoric oil in the coating film are controlled within specific ranges. When they deviate from the ranges, both or either of the effect of decreasing the friction coefficient and the insertion force and/or the effect of lowering contact resistance are/is hindered.

DETAILED DESCRIPTION OF THE PREFERRED EMBODIMENTS (Proportion of Fluoric Resin Particles)

The proportion of fluoric resin particles to the total amount of the fluoric resin particles and fluoric oil in a coating film is set at 20% to 40% in mass. By controlling the proportion of the fluoric resin particles in the range, the coating film can have a sufficiently decreased friction coefficient and sufficiently lowered contact resistance more surely (at a higher level).

When the proportion of fluoric resin particles is less than 20% in mass, the effect of the fluoric resin particles on the decrease of a friction coefficient diminishes. On the other hand, when the proportion of the fluoric resin particles exceeds 40% in mass, the parts, to which the fluoric resin particles do not adhere, on the surface of the conductive substrate of a connector decrease and the contact resistance rises. For those reasons, in consideration of the balance between the effect of decreasing a friction coefficient and the effect of lowering contact resistance, the proportion of the fluoric resin particles to the total amount of the fluoric resin particles and the fluoric oil in a coating film is set at 20% to 40% in mass.

(Coating Film Thickness)

The thickness of a coating film comprising the mixture of fluoric resin particles and fluoric oil according to the present invention is, in consideration of the balance between the effect of decreasing a friction coefficient and the effect of lowering contact resistance, set at 0.2 to 0.5 µm in the state after volatilizing the solvent for coating which will be described later.

When the thickness of the coating film is less than 0.2 µm, the fluoric resin particles are insufficient and thus the effect of decreasing a friction coefficient diminishes. On the other hand, when the thickness of the coating film exceeds 0.5 µm, though it also depends on the proportion of the fluoric resin particles in the mixture, there is a high degree of possibility that the fluoric resin particles are excessive, the parts, to which the fluoric resin particles do not adhere, on the surface of the conductive substrate of a connector decrease, and thus the contact resistance rises. For those reasons, the thickness of the coating film is set at 0.2 to 0.5 µm.

(Fluoric Resin Particles)

The diameter of fluoric resin particles varies in a wide range from several tenths of microns to several hundreds of microns (the production method also varies in accordance with the particle diameter). In the present invention, it is possible to variously use the particles in the above diameter range. The effects of the fluoric resin particles show up even when the amount or the number thereof is small. However, the effects of fluoric resin particles are affected by the surface roughness of the conductive substrate which is a base material and, in consideration of the surface roughness of an ordinary tin-plated copper plate for example, it is desirable that the diameter of the fluoric resin particles is in the range roughly from several tenths of microns to several tens of microns in order to exhibit the effects of the fluoric resin particles to the utmost.

For example, the surface roughness (Ra) of a tin-plated copper plate is usually about 0.2 μm or less. Hence, it is desirable that the diameter of the fluoric resin particles such as PTFE and the like is equal to or larger than the surface roughness of a conductive substrate. When the particle diameter is too large, the particles are likely to fall off from the substrate and sometimes hinder the contact between terminals. In contrast, when the particle diameter is too small, the fluoric resin particles intrude into the recesses of a substrate and a sufficient effect of reducing friction is not obtained in some cases. For those reasons, it is desirable that the diameter of the fluoric resin particles is in the range roughly from several tenths of microns to several tens of microns as stated above.

The examples of commercially available particle diameters in the above range are: 1 to 2, 4 to 5, 5 to 6, 10 to 15, and 20 μm made by Shamrock Technologies, Inc., U.S.A.; and 0.2 to 0.4 μm made by Daikin Industries, Ltd.

As the kinds of fluoric resin particles, PTFE (polytetrafluoroethylene) is most generally adopted. However, besides PTFE, the following resins are listed as fluorine containing resins and the particles of them can be used in the same way as PTFE.
(1) PFA (tetrafluoroethylene perfluoroalkylvinylether copolymer)
(2) FEP (tetrafluoroethylene hexafluoropropylene copolymer)
(3) ETFE (tetrafluoroethylene ethylene polymer)
(4) PCTFE (polychlorotrifluoroethylene)
(5) ECTFE (chlorotrifluoroethylene ethylene copolymer)
(6) PVDF (polyvinyliden fluoride)
(7) PVF (polyvinyl fluoride)

(Fluoric Oil)

Fluoric oil is essential for improving the wettability of fluoric resin particles, attaching fluorine particles to the surface of a conductive substrate, and forming a coating film containing fluorine particles. Fluoric resin particles are poor in wettability with an organic solvent but good in wettability with fluoric oil, and therefore fluoric oil intruding between the conductive substrate and the fluoric resin particles attaches the fluorine particles to the surface of the conductive substrate by the capillary attraction thereof.

Further, fluoric oil itself is chemically stable and has lubricity. Hence, a considerable degree of lubricity can be secured even when the terminal surfaces to which fluoric resin particles do not adhere touch each other. Meanwhile, the fluoric oil itself is liquid and hence, even when terminals directly touch each other, it flows moderately and thereby does not hinder conductivity between touching terminals (direct touch at the microscopic protrusions on the surfaces of the terminals).

Furthermore, since fluoric oil is synthetic oil, any molecular weight can be chosen with no restriction, and it does not evaporate at a temperature during handling and exhibits stable performance in the temperature range from room temperature to a high temperature.

As the fluoric oil having such characteristics, it is desirable to use perfluoropolyether type oil. As the perfluoropolyether type oil, PFPE (perfluoroalkylpolyether) is named. PFPE is produced by introducing oxygen to the backbone chain [-(CF2CF2)n-] of PTFE (polytetrafluoroethylene) so as to improve the flexibility of the backbone chain and form a high polymer which is liquid at room temperature.

Since PTFE has small surface energy due to the C-F link, the friction coefficient thereof is small. However, PTFE is solid and nonconductive and hence not preferable from the viewpoint of securing conductivity between terminals.

PFPE has a larger friction coefficient than PTFE. However, since PFPE is liquid (has fluidity), it does not hinder direct contact between terminals and can surely secure conductivity between metallic materials. Further, the self-recovery of a lubricating film at the time of sliding can also be expected.

At terminals, conductivity has to be secured between conductive substrates. If the entire surfaces of conductive substrates are covered with PTFE (solid), conductivity is not secured between the conductive substrates. It is desirable to expose substantial parts of terminal materials (conductive substrates) and avoid hindering the contact between the substrates.

PFPE functions as a disperser at the time of the coating of PTFE, further a binder to moderately attach PTFE to the surface of a solid, and moreover a lubricant by itself. Note that, since PTFE has water repellency and oil repellency, it hardly disperses in a solvent other than PFPE but easily disperses in PFPE. Further, PFPE functions as a lubricant as stated above but it does not hinder conductivity.

PFPE different in the structure of the backbone chain and side-chain due to the difference of the manufacturing method is commercialized and a KX-type, a DS-type, and an FZ-type are commercialized for example. Those are derived from the difference of the molecular structure and different in the properties of viscosity and the pressure and temperature dependency of the viscosity, but any of the above types can be used as fluoric oil of the present invention without problems. Further, by introducing various terminal groups in the molecules of fluoric oil, the adsorptivity to the surface of a conductive substrate can be varied.

As such PFPE, commercially available fluoric lubricating oil, for example the Demnum series (normal chain type) made by Daikin Industries, Ltd., or the like may arbitrarily be used.

(Coating Method)

A method for coating the surface of a conductive substrate with a coating film according to the present invention comprises the processes of: diluting and dispersing the mixture of fluoric resin particles and fluoric oil (fluorine oil), the mixture having the aforementioned proportion of the fluoric resin particles, in a solvent; and applying the mixture to the surface of the conductive substrate so that the aforementioned coating thickness and proportion of the fluoric resin particles are secured. Note that, the coating mentioned in the present invention may be replaced with dipping or the like and basically the coating may be applied by a publicly known method.

As a solvent to be used, a commercially available fluoric solvent (cleaning agent, diluent) is preferably used in consideration of: the requirement that it does not adversely affect a conductive substrate, fluoric resin particles and fluoric oil, and has a high volatility at room temperature and also high reducibility and dispersibility with the fluoric resin particles and fluoric oil; and moreover incombustibility, operability and safety. Here, commercially available fluoric solvents which are not specific fluoric chemicals restricted from the viewpoint of global environment, for example various kinds of improved (substituted for specific fluoric chemicals) fluoric solvents, such as Asahiklin AK-225 (dichloropentafluoropropane) made by Asahi Glass Co., Ltd. or HFE (hydrofluoroether), may arbitrarily be used.

(Substrate)

As a conductive substrate of a connector contact material according to the present invention, copper or copper alloy, copper alloy to which tin plating or tin alloy plating is applied, or aluminum or aluminum alloy, those being practically used already, may arbitrarily be used.

EXAMPLES

Examples of the present invention are hereunder explained.

Under the conditions shown in Table 1, coating liquids 4 (A to M) having the various proportions (wt %), shown in Table 1, of the solid component of fluoric resin particles 2 to the solid content of fluoric oil 1 were prepared by dispersing and diluting the fluoric oil 1 and the fluoric resin particles 2 in a fluoric solvent 3.

The coating liquids A to M were applied to the surfaces of tin-plated copper alloy plates (brass plates) as the substrates of connector contact materials so as to form the coating films having the thicknesses shown in Table 1. Then the coated plates were dried at room temperature, covered with coating films formed by sufficiently volatilizing the fluoric solvent, and used as the test materials. Table 2 shows the proportions (mass %) of the fluoric resin particles to the total amount of the fluoric resin particles and the fluoric oil in the coating films and the thicknesses ($\mu m$) of the coating films of the test materials.

The proportion of the fluoric resin particles in the coating film and the thickness of the coating film of each test material were measured in the following manner. Further, the friction coefficient (kinetic friction coefficient) and contact resistance were measured in the following manner as the performance of the coating film of each test material. Those results are also shown in Table 2.

(Proportion of Fluoric Resin Particles and Thickness of Coating Film)

The proportion (mass %) of fluoric resin particles to the total amount of the fluoric resin particles and fluoric oil in the surface coating film and the thickness ($\mu m$) of the surface coating film of each test material were measured by infrared spectroscopy. That is, the proportion and the mean coating film thickness of each test material were measured by carrying out quantitative analysis using the reflection spectrum of a coated test material and the spectra of the fluoric resin particles and fluoric oil used for the formation of the coating film. Here, as the spectra of the fluoric resin particles and fluoric oil, spectra of the substances produced by separating and extracting those from a coated test material with a solvent may be used.

(Friction Coefficient)

The surface property tester HEIDON type-14DR made by Shinto Science Co., Ltd. was used for the measurement of a friction coefficient. That was, the same prepared test materials (10×10×50 mm) were stacked on a block so that the coating films touched each other at a prescribed area, and the upper side test material was pulled in the horizontal direction at a speed of 6,000 mm/min with an autograph while imposing a normal load of 200 g/cm². On this occasion, the tension (F) was measured with a load cell and then a kinetic friction coefficient (i) was calculated by the following expression A;

$$\mu = F/N \qquad \qquad A,$$

where N means a normal load 200 g/cm².

Then, the case where a kinetic friction coefficient $\mu$ was less than 0.20 was regarded as having a large effect of weakening the insertion force (the effect of decreasing the friction coefficient) to the extent of fitting a connector without an auxiliary tool such as a bolt or a lever to cope with the multipolarization of a connector up to 30 to 40 poles, and evaluated as the mark ⊚. Then, the case where a kinetic friction coefficient $\mu$ was in the range from 0.20 to less than 0.30 was regarded as having a certain effect, though it was less than the above case of the mark ⊚, of weakening the insertion force (the effect of decreasing the friction coefficient) to the extent of withstanding the multipolarization of a connector under some service conditions, and evaluated as the mark ◯. Further, the case where a kinetic friction coefficient $\mu$ was 0.30 or more was regarded as not having the effect of weakening the insertion force (the effect of decreasing the friction coefficient) to the extent of withstanding the multipolarization of a connector, and evaluated as the mark X.

(Contact Resistance)

A contact resistance (m$\Omega$) was obtained by: using a test material produced by applying waterproof painting to the edge of the test material and thereafter leaving the test material for 24 hours in the atmosphere of 40° C. in temperature and 85% in humidity; measuring the contact resistance of the test material at the open-circuit voltage of 20 mV, the current of 10 mA and the slide load of 100 gf by the four terminal method; and averaging plural measured contact resistance values.

Then, the case where a contact resistance was less than 1.5 m$\Omega$ was regarded as being usable for the multipolarization of a connector without lowering the conductivity (without raising the contact resistance) and having a large effect of inhibiting the rise of the contact resistance, and evaluated as the mark ⊚. Then, the case where a contact resistance was in the range from 1.5 m$\Omega$ to less than 3.0 m$\Omega$ was regarded as having a certain effect, though it was less than the above case of the mark ⊚, of inhibiting the rise of the contact resistance to the extent of withstanding the multipolarization of a connector under some service conditions, and evaluated as the mark ◯. Further, the case where a contact resistance was 3.0 m$\Omega$ or more was regarded as not having the effect of inhibiting the rise of the contact resistance to the extent of withstanding the multipolarization of a connector, and evaluated as the mark X.

In the cases of the invention examples 6, 7, 9, 11, 14 and 15 in Table 2, as it is obvious from Table 1, the coating liquids F, G, H, K and L shown in Table 1 are used, and, as shown in Table 2, the thicknesses of the coating films on the surfaces of the substrates are controlled in the range from 0.2 to 0.5 $\mu m$ and the proportions of the fluoric resin particles to the total amount of the fluoric resin particles and the fluoric oil in the coating films are also controlled in the range from 20% to 40% in mass.

As a result, in the cases of the above invention examples, to the extent of withstanding the multipolarization of a connector, the effect of weakening an insertion force (the effect of decreasing a friction coefficient) is secured or even substantial, simultaneously the effect of inhibiting the rise of contact resistance is also secured or even substantial, and thus the conflicting two characteristics are secured at the same time. As a consequence, it is understood that the above materials are suitable as connector contact materials withstanding the multipolarization of a connector.

On the other hand, in the cases of the comparative examples 1 to 5, 8, 10, 12, 13 and 16 in Table 2, as it is obvious from Table 1, the coating liquids A to D, E, G, I, J and M shown in Table 1 are used, and, as shown in Table 2, either the thickness of the coating film on the surface of a substrate deviates from the range from 0.2 to 0.5 $\mu m$ or the proportion of the fluoric resin particles to the total amount of the fluoric resin particles and the fluoric oil in a coating film deviates from the range from 20% to 40% in mass.

As a result, in the cases of the above comparative examples, either the effect of weakening an insertion force (the effect of decreasing a friction coefficient) or the effect of inhibiting the rise of contact resistance to cope with the multipolarization of a connector is considerably inferior and thus the conflicting two characteristics are not secured at the same time. As a consequence, it is understood that the above materials are unsuitable as connector contact materials withstanding the multipolarization of a connector.

More specifically, the coating films of the comparative examples 1 to 4 contain only fluoric oil and do not contain fluoric resin particles. As a result, the effect of weakening an insertion force (the effect of decreasing a friction coefficient) is small. Hence, the significance of including fluoric resin particles in order to exhibit the effect of weakening an insertion force (effect of decreasing a friction coefficient) is obvious.

In the cases of the comparative examples 5 and 13, the proportions of the fluoric resin particles in the coating films are less than 20% in mass and too low. As a result, though the coating film thicknesses satisfy the range stipulated in the present invention and the effect of inhibiting the rise of contact resistance is substantial, the effect of weakening an insertion force (the effect of decreasing a friction coefficient) is small in comparison with the invention examples.

In the cases of the comparative examples 12 and 16, in contrast, the proportions of the fluoric resin particles in the coating films exceed 40% in mass and are too high. As a result, though the coating film thicknesses satisfy the range stipulated in the present invention and the effect of weakening an insertion force (the effect of decreasing a friction coefficient) is large, the contact resistance is high and the effect of inhibiting the rise of contact resistance is small in comparison with, for example, the invention example 11 wherein the proportion of the fluoric resin particles in the coating film is the upper limit, namely 40% in mass. Those results show the significance of stipulating the proportion of fluoric resin particles in a coating film according to the present invention.

The coating film of the comparative example 8 is formed by using the coating liquid G which is the same as used in the invention examples but the thickness thereof is not more than 0.2 µm and too thin. As a result, though the proportion of the fluoric resin particles in the coating film satisfies the ranges stipulated in the present invention, the effect of weakening an insertion force (the effect of decreasing a friction coefficient) is small particularly in comparison with the invention example 7 where the same coating liquid G is used.

In contrast, the coating film of the comparative example 10 is formed by using the coating liquid G which is the same as used in the invention examples but the thickness thereof exceeds 0.5 µm and is too thick. As a result, though the proportion of the fluoric resin particles in the coating film satisfies the range stipulated in the present invention and the effect of weakening an insertion force (the effect of decreasing a friction coefficient) is large, the contact resistance is large and the effect of inhibiting the rise of contact resistance is small particularly in comparison with the invention example 7 where the same coating liquid G is used. Those results show the significance of stipulating the thickness of a coating film according to the present invention.

TABLE 1

| Category | Code | 1. Fluoric oil Trade name | Molecular weight | Kinetic viscosity at 40° C. (cSt) | Loads (g) | 2. Fluoric resin particles Trade name | Particle diameter (µm) | Loads (g) |
|---|---|---|---|---|---|---|---|---|
| *Comparative | A | Demnum S-20 | 2700 | 25 | 0.20 | — | — | — |
| Comparative | B | Demnum S-65 | 4500 | 65 | 0.20 | — | — | — |
| Comparative | C | Demnum S-100 | 5600 | 100 | 0.20 | — | — | — |
| Comparative | D | Demnum S-200 | 8400 | 200 | 0.20 | — | — | — |
| Comparative | E | Demnum S-20 | 2700 | 25 | 0.20 | Lubron L-2 | 0.3 | 0.01 |
| *Inventive | F | Demnum S-20 | 2700 | 25 | 0.20 | Lubron L-2 | 0.3 | 0.05 |
| Inventive | G | Demnum S-20 | 2700 | 25 | 0.20 | Lubron L-2 | 0.3 | 0.10 |
| Inventive | H | Demnum S-20 | 2700 | 25 | 0.20 | Lubron L-2 | 0.3 | 0.13 |
| Comparative | I | Demnum S-20 | 2700 | 25 | 0.20 | Lubron L-2 | 0.3 | 0.20 |
| Comparative | J | Demnum S-20 | 2700 | 25 | 0.20 | SST-3H | 5-6 | 0.01 |
| Inventive | K | Demnum S-20 | 2700 | 25 | 0.20 | SST-3H | 5-6 | 0.05 |
| Inventive | L | Demnum S-20 | 2700 | 25 | 0.20 | SST-3H | 5-6 | 0.10 |
| Comparative | M | Demnum S-20 | 2700 | 25 | 0.20 | SST-3H | 5-6 | 0.16 |

| Category | Code | 3. Fluoric solvent Trade name | Loads (g) | 4. Coating liquid Proportion of solid content of 1 and 2 in solvent 3 (wt %) | Coating film thickness before drying (µm) |
|---|---|---|---|---|---|
| *Comparative | A | Asahiklin AK225 | 10.0 | 1.96 | 9 |
| Comparative | B | Asahiklin AK225 | 10.0 | 1.96 | 9 |
| Comparative | C | Asahiklin AK225 | 10.0 | 1.96 | 13 |
| Comparative | D | Asahiklin AK225 | 10.0 | 1.96 | 13 |
| Comparative | E | Asahiklin AK225 | 10.0 | 2.06 | 10 |
| *Inventive | F | Asahiklin AK225 | 10.0 | 2.44 | 9 |
| Inventive | G | Asahiklin AK225 | 10.0 | 2.91 | 9 |
| Inventive | H | Asahiklin AK225 | 10.0 | 3.19 | 8 |
| Comparative | I | Asahiklin AK225 | 10.0 | 3.85 | 7 |
| Comparative | J | Asahiklin AK225 | 10.0 | 2.06 | 11 |
| Inventive | K | Asahiklin AK225 | 10.0 | 2.44 | 9 |
| Inventive | L | Asahiklin AK225 | 10.0 | 2.91 | 9 |
| Comparative | M | Asahiklin AK225 | 10.0 | 3.47 | 8 |

*Comprative: comparative example, Inventive: inventive example

TABLE 2

| Category | Code | Coating liquid Table 1 | Coating film condition Proportion of fluoric resin particles* (mass %) | Coating film thickness (μm) | Overall characteristics of coating film Friction coefficient decreasing effect Friction coefficient μ | Judgment | Contact resistance inhibiting effect Contact resistance R (mΩ) | Judgment | Overall judgment |
|---|---|---|---|---|---|---|---|---|---|
| **Reference | — | — | — | — | 0.49 | — | 0.20 | — | — |
| **Comparative | 1 | A | 0.0 | 0.18 | 0.36 | X | 0.33 | ◎ | X |
| Comparative | 2 | B | 0.0 | 0.18 | 0.34 | X | 0.30 | ◎ | X |
| Comparative | 3 | C | 0.0 | 0.27 | 0.36 | X | 0.27 | ◎ | X |
| Comparative | 4 | D | 0.0 | 0.27 | 0.31 | X | 0.33 | ◎ | X |
| Comparative | 5 | E | 4.8 | 0.22 | 0.32 | X | 0.33 | ◎ | X |
| **Inventive | 9 | F | 20.0 | 0.22 | 0.26 | ○ | 1.48 | ◎ | ○ |
| Inventive | 7 | G | 33.3 | 0.27 | 0.21 | ○ | 1.96 | ○ | ○ |
| Comparative | 8 | G | 33.3 | 0.18 | 0.33 | X | 1.40 | ◎ | X |
| Inventive | 9 | G | 33.3 | 0.50 | 0.18 | ◎ | 2.05 | ○ | ○ |
| Comparative | 10 | G | 33.3 | 0.61 | 0.16 | ◎ | 3.50 | X | X |
| Inventive | 11 | H | 40.0 | 0.27 | 0.15 | ◎ | 2.50 | ○ | ○ |
| Comparative | 12 | I | 50.0 | 0.27 | 0.18 | ◎ | 4.27 | X | X |
| Comparative | 13 | J | 4.8 | 0.22 | 0.32 | X | 0.40 | ◎ | X |
| Inventive | 14 | K | 20.0 | 0.22 | 0.23 | ○ | 1.55 | ○ | ○ |
| Inventive | 15 | L | 33.3 | 0.27 | 0.19 | ◎ | 1.47 | ◎ | ◎ |
| Comparative | 16 | M | 45.0 | 0.27 | 0.15 | ◎ | 3.85 | X | X |

*Proportion of fluoric resin particles to the total amount of fluoric resin particles and fluoric oil (mass %)
**Reference: reference example, Comparative: comparative example, Inventive: inventive example The present invention makes it possible to provide a connector contact material that has a small friction coefficient, requires a small insertion force, and moreover does not raise contact resistance while maintaining the properties and insertion operability as a connector. As a consequence, it is possible to preferably use the material as a connector contact material for multipole terminals and obtain a multipole terminal having a small insertion force and a low contact resistance.

The foregoing invention has been described in terms of preferred embodiments. However, those skilled in the art will recognize that many variations of such embodiments exist. Such variations are intended to be within the scope of the present invention and the appended claims.

What is claimed is:

1. An electrical connector contact comprising a coating film on a surface of the electrical connector contact substrate wherein
   a thickness of the coating film on a surface of the electrical connector contact substrate is 0.2 to 0.5 μm; and
   the coating film on the surface of the electrical connector contact comprises
   a fluoric oil, and
   fluoric resin particles, wherein
   a proportion of the fluoric resin particles to the total amount of the fluoric resin particles and the fluoric oil in the coating film is 20% to 40% in mass and
   the fluoric oil consists of an unsubstituted perfluoropolyether.

2. The electrical connector contact according to claim 1, wherein the the fluoric resin particle comprises a fluorine resin selected from the group consisting of polytetrafluoroethylene, a tetrafluoroethylene perfluoroalkylvinyl ether copolymer, a tetrafluoroethylene hexafluoropropylene copolymer, a tetrafluoroethylene ethylene copolymer, polychlorotrifluoroethylene, a chlorotrifluoroethylene ethylene copolymer, polyvinylidene fluoride and polyvinylfluoride.

3. The electrical connector contact according to claim 1, wherein the fluoric resin particles comprise polytetrafluoroethylene.

4. The electrical connector contact according to claim 1, wherein the electrical connector contact substrate comprises copper or a copper alloy.

5. A multipole terminal comprising the electrical connector contact according to claim 1.

6. The electrical connector contact according to claim 1, wherein a diameter of the fluoric resin particle is in the range from about 0.2 to 20 μm.

* * * * *